US012062082B2

(12) United States Patent
Porter et al.

(10) Patent No.: US 12,062,082 B2
(45) **Date of Patent: *Aug. 13, 2024**

(54) SYSTEMS FOR ENABLING ACCESS TO A SHIPPING BENEFIT FROM SELLER CONTENT

(71) Applicant: AMAZON TECHNOLOGIES, INC., Seattle, WA (US)

(72) Inventors: Beth Anne Porter, Seattle, WA (US); Ryan John Lohan, Seattle, WA (US); Kimberly Anne Butin, Denver, CO (US); Felipe Gustavo De Almeida, Redmond, WA (US); Venkatraman Prabhu, Seattle, WA (US); Thomas Edward Taylor, Seattle, WA (US); Andrew John Van Zeeland, Bellevue, WA (US); Trushna Dilip Khivasara, Seattle, WA (US); Kadir Rathnavelu, Seattle, WA (US); Jared Saul Brett, Indianapolis, IN (US); Peter Larsen, Seattle, WA (US); Kristiana Helmick Ebert, Seattle, WA (US); Nicole Netland, Mahtomedi, MN (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/649,985

(22) Filed: Feb. 4, 2022

(65) Prior Publication Data

US 2023/0177592 A1 Jun. 8, 2023

Related U.S. Application Data

(63) Continuation-in-part of application No. 17/457,527, filed on Dec. 3, 2021.

(51) Int. Cl.
*G06Q 30/06* (2023.01)
*G06Q 10/083* (2023.01)
(Continued)

(52) U.S. Cl.
CPC ....... *G06Q 30/0633* (2013.01); *G06Q 10/083* (2013.01); *G06Q 20/12* (2013.01); *G06Q 30/0609* (2013.01); *G06Q 30/0641* (2013.01)

(58) Field of Classification Search
CPC ........... G06Q 30/0633; G06Q 30/0609; G06Q 30/0641; G06Q 10/063; G06Q 20/12
(Continued)

(56) References Cited

U.S. PATENT DOCUMENTS 6,456,892 B1 * 9/2002 Dara-Abrams ..... H04L 12/2814 710/72
8,204,799 B1 6/2012 Murray et al.
(Continued)

FOREIGN PATENT DOCUMENTS

EP 3719726 A1 10/2020

OTHER PUBLICATIONS

Article, "Shelterzoom Corp Submits United States Patent Application for Offer Management and Transaction Management System" ; Global IP News. Business and Commerce Patent News [New Delhi] Sep. 30, 2021; retrieved from Dialog on Jan. 18, 2024 (Year: 2021).*

(Continued)

*Primary Examiner* — Yogesh C Garg
(74) *Attorney, Agent, or Firm* — Lindauer Law, PLLC

(57) ABSTRACT

A seller provides customers with the ability to order items using shipping benefits associated with a separate fulfillment entity, such as an online store, by providing inventory to a designated fulfilment location. When a customer accesses the webpage, identifiers for the customer device and item are
(Continued)

used to determine an estimated delivery time the separate fulfillment entity may provide, which may be presented in a widget or other type of element within the webpage. In response to input to the element, the customer may be presented with a prompt for authentication data, and after a successful authentication, the estimated delivery time may be updated based on a location of the authenticated customer. In response to input confirming the transaction, an order for the item is generated by the separate fulfillment entity and the customer may continue navigating the seller website.

20 Claims, 6 Drawing Sheets

(51) Int. Cl.
*G06Q 20/12* (2012.01)
*G06Q 30/0601* (2023.01)

(58) Field of Classification Search
USPC .............................................. 705/26.35, 26.1
See application file for complete search history.

(56) References Cited

U.S. PATENT DOCUMENTS 9,047,607 B1 6/2015 Curial et al.
9,761,061 B1 9/2017 Bussell et al.
10,270,878 B1 * 4/2019 Uppal ..................... H04L 45/02
10,489,841 B1 11/2019 Ogborn et al.
10,593,173 B2 * 3/2020 Roth ................ G08B 13/19669
10,789,566 B1 9/2020 Masterman
2012/0203614 A1 * 8/2012 Chen .................. G06Q 30/0224
705/14.25
2017/0118025 A1 * 4/2017 Shastri ...................... H04L 9/00
2017/0278062 A1 9/2017 Mueller et al.
2020/0090119 A1 3/2020 Shiely et al.
2020/0151659 A1 5/2020 Gregory et al.
2020/0160428 A1 5/2020 Calvo et al.
2021/0110341 A1 4/2021 Rehn et al.
2022/0394468 A1 * 12/2022 Avetisov ............... H04L 63/083

OTHER PUBLICATIONS

Berlea, Alexandru, "Patent Cooperation Treaty International Search Report and Written Opinion dated Mar. 16, 2023", Patent Cooperation Treaty Application No. PCT/US22/80634, Patent Cooperation Treaty, Mar. 16, 2023.

Pond, Robert M., "Non-final Office Action dated Mar. 19, 2024", U.S. Appl. No. 17/457,527, The United States Patent and Trademark Office, Mar. 19, 2024.

* cited by examiner

Continued in FIG. 2B

SYSTEMS FOR ENABLING ACCESS TO A SHIPPING BENEFIT FROM SELLER CONTENT

PRIORITY

This application is a continuation-in-part of and claims priority to the prior-filed U.S. patent application having the application Ser. No. 17/457,527, filed Dec. 3, 2021. Application Ser. No. 17/457,527 is incorporated by reference herein in its entirety.

BACKGROUND

Many merchants offer items for purchase, rent, lease, subscription, and so forth using online content, such as a "Direct-to-Consumer" (DTC) website that is specific to a particular merchant. Larger entities, such as online stores that offer items associated with multiple merchants, may offer various benefits to customers, such as expedited shipping, shipping at an advantageous cost, and so forth. These benefits are typically possible due to possession by the online store of large amounts of data, such as customer locations, locations of stored items, the locations and capabilities of multiple shipping providers, and so forth. Sellers of items through DTC websites rather than larger online stores are typically unable to offer similar benefits.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
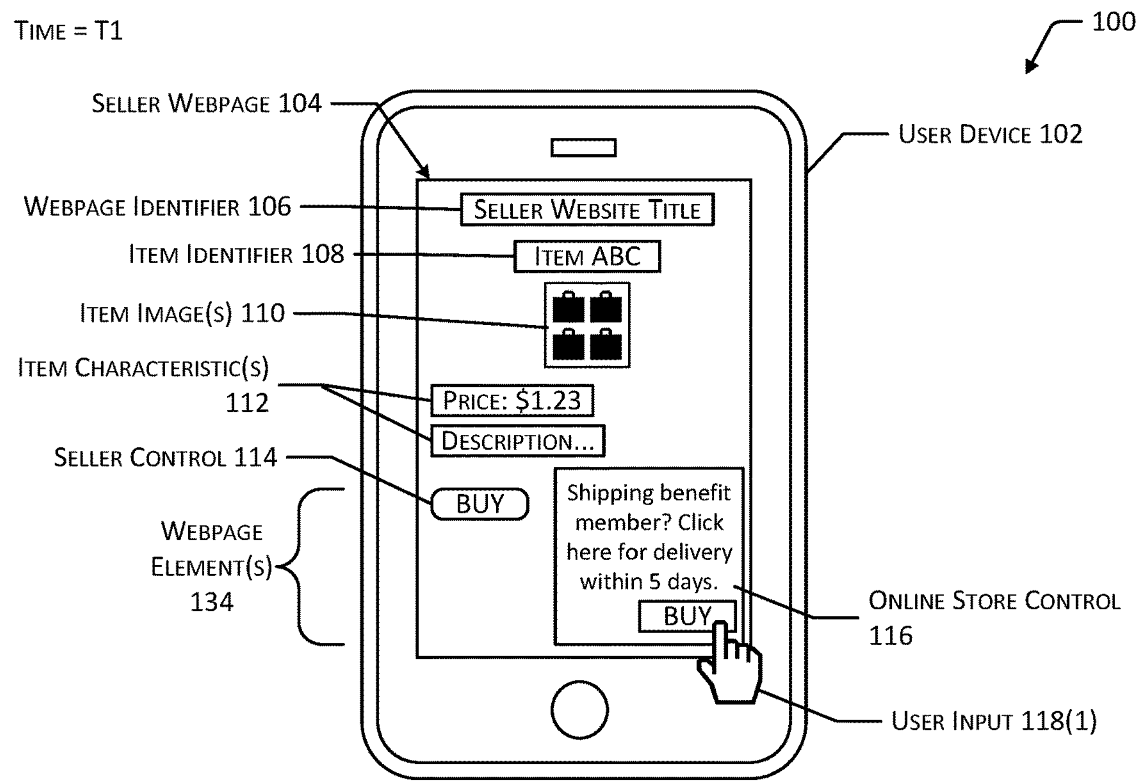
FIGS. 1A and 1B are diagrams illustrating a user device accessing a seller website that enables access by the user device to a shipping benefit associated with a separate online store to transport items offered using the seller website.
Figure 1A:
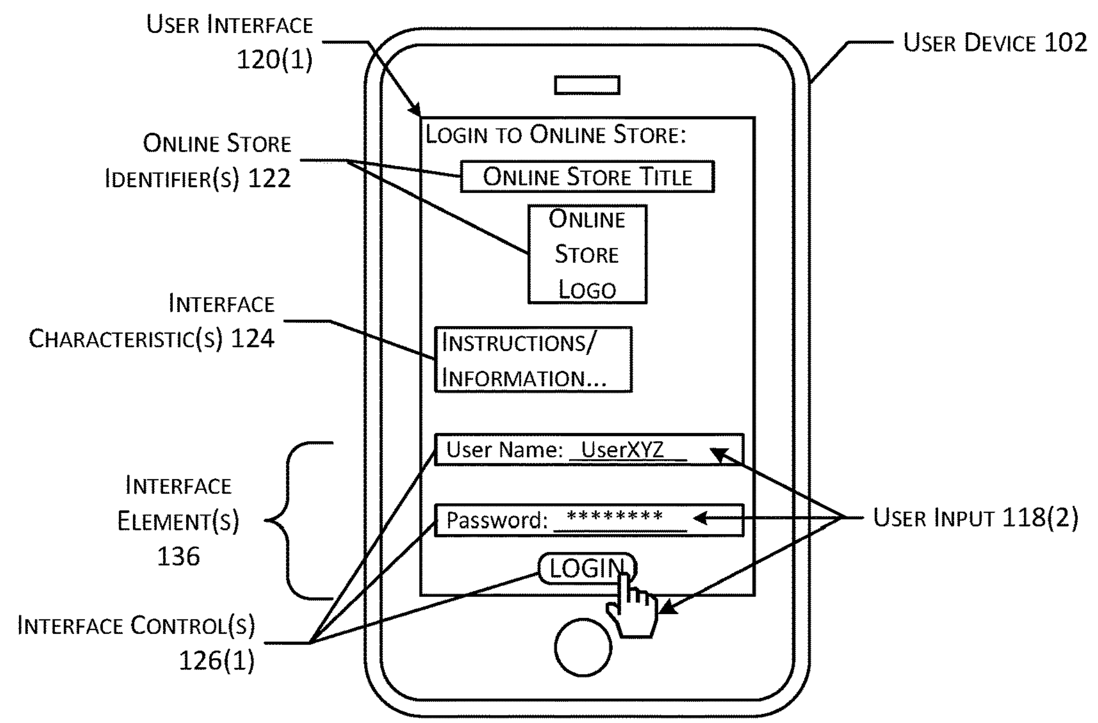

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Numerous sellers may offer items for purchase, lease, rental, and so forth using a website associated with the seller. For example, a seller may utilize a "Direct-to-Consumer" (DTC) website, a "Direct-to-Business" (DTB) website, or one or more other types of websites or interfaces, to present information regarding an item. The DTC website may include one or more controls for initiating a transaction associated with the item, responsive to which a delivery process associated with the seller or the DTC website may be initiated. The types, timeframes, and other characteristics for shipping of items offered by a seller through a DTC website are typically limited based on the capabilities of the seller. For example, if the seller is a small business, the numbers and types of shipping options available, and the prices and delivery times associated with shipment of items, may be less advantageous than the shipping options associated with a large online store. Continuing the example, a large online store may possess significant amounts of data indicative of customer locations, locations of warehouses, distribution centers, or other locations where items are stored, locations and capabilities of shipping providers, and so forth. In such a case, a large online store may offer beneficial shipping options, such as shipment at no cost or a reduced cost, shipment within an expedited timeframe, and so forth. For example, an online store may offer a membership program for which enrolled users may provide delivery addresses, and enrolled sellers may provide items to designated warehouses or other types of fulfilment locations. Using the known addresses and locations of items, the online store may then determine efficient methods for shipping items that enable lower costs and faster delivery times. However, these shipping benefits are typically limited to sellers that offer items using a website associated with the online store, to customers that are eligible for these benefits and that initiate transactions for the items using the online store website.

In many cases, a seller may wish to offer the beneficial shipping options associated with an online store to users of a DTC website, DTB website, or other type of website or interface associated with the seller, without selling items using a website associated with a separate online store. The online store may wish to offer beneficial shipping options to users that have chosen to subscribe to this service of the online store, even for certain items that are purchased using other websites associated with selected sellers. For example, a seller may be incentivized to deliver items to customers using a fulfilment network of an online store, because offering shipping benefits associated with the online store may incentivize customers to initiate transactions for items using the seller website. The online store may be incentivized to offer enhanced shipping benefits for items sold using the seller website, because offering this incentive may incentivize customers to enroll in a membership service or other type of service to receive these benefits and may foster good will and brand recognition for the online store among customers and sellers.

Described in this disclosure are systems for enabling a seller having a seller website, other types of online content, or in some cases a seller associated with a physical geolocation, to allow customers to purchase items presented using the seller's content or geolocation, using the shipping benefits of a third-party fulfilment network, such as a large online store or other retailer. For example, a seller may enter into an arrangement with an online store and designate one or more items to be available using the fulfilment options associated with the online store. The seller may communicate characteristics of the item(s) to the online store such as item categories, dimensions, weights, storage requirements, and so forth, and characteristics of the seller such as locations associated with customers that have previously purchased the seller's items, current locations where designated items are stored by the seller, and so forth. Based on this information, one or more locations, such as warehouses, distribution centers and so forth, that are accessible by a fulfilment network associated with the online store may be determined and communicated to the seller, who may provide at least a threshold quantity of the designated item(s) from a current location where the items are stored by the seller to the selected location(s) where the items may be delivered to customers using the fulfilment network. The online store may then generate code or other computer-executable instructions that may be used in conjunction with the code of the seller website to cause presentation of a widget or other type of control when a user accesses the seller website. The widget or other type of control may function to present information, receive user input, or combinations thereof. When a user device accesses the seller website and views a webpage associated with the item, data indicative of the availability of a fulfilment option for the item, using the fulfilment network associated with the online store, may be presented using the widget or other type of control. In some implementations, an identifier indicative of the item and an identifier indicative of the user device, such as a network address, may be sent to a computing device associated with the online store. Based on these identifiers, the online store may determine one or more characteristics of the item, such as a location where the item is stored, and an estimated location of the user based on the network address of the user device. This information may be used to determine an estimated delivery time to transport the item from the location where the item is stored to the estimated location of the user, which may also be presented within the widget or other type of control. For example, the characteristics of the item, the location of the item, and the estimated location of the user may be used in conjunction with shipping data that indicates the capabilities of one or more shippers to transport the item to determine a timeframe for transport of the item to the estimated location of the user. In some implementations, the control may include a field or other element for input or selection of a different location. For example, the control may include a field for input of an address, zip code, or other indication of geolocation, or a selector or other types of interfaces that may receive user input. In response to input to the element, a delivery time to transport the item to the indicated location may be determined and presented using the control. In cases where the item is stored at multiple locations, estimated delivery times may be determined for transport of the item from each location, and the shortest estimated delivery time may be presented in association with the control.

The widget or other type of control may include a button, link, or other type of element that may receive input, such as to indicate interest in acquiring an item using the shipping benefit(s) associated with the online store. In response to input provided in association with the control, data may be provided to cause presentation on the user device of a prompt or other type of interface for receiving authentication data. For example, a user may provide an account name and password for an existing user account, create a new user account, or provide another type of authentication using the presented prompt or other interface. A user account associated with the received authentication data may be determined or created, and a location associated with the user account may be determined. For example, a user account may be associated with a residence address, a default delivery address, or other indication of geolocation. Based on the location associated with the user account, the location of the item, the characteristics of the item, and the shipping data, a delivery time associated with transport of the item from the current location of the item to the location associated with the user account may be determined. In some implementations, a user may input or select a different location, and an updated delivery time may be determined based on the different location and presented using the widget or other control. As described previously, in cases where the item is stored at multiple locations, delivery times for transport of the item from each location may be determined, and information indicative of the shorter delivery time may be presented. In some implementations, an authorization status associated with the user account may be determined, which may indicate eligibility of the user account to receive the item within the indicated delivery time using the shipping benefit associated with the online store. For example, determining the authorization status may include determining membership of the user account in a program associated with the shipping benefits, membership of the seller in such a program, availability of the shipping benefits for use with the item, a quantity of inventory of the item at a selected location that exceeds a threshold quantity, conditions selected by the online store for use of the shipping benefit that are met by the user and the seller, and so forth.

The presented control may include a button or other element to initiate a transaction associated with the item. In response to input provided to the element, data may be provided to cause the user device to present an indication of the item, the location to where the item is to be delivered, and a payment option associated with the user account. In some cases, this presented data may include one or more elements that enable input or selection of a different location or payment option. The presented data may also include an element that may be used to confirm and initiate the transaction. In response to input to the element, order data may be generated to cause transport of the item to the location associated with the user account, or another selected location if input was provided to select a different location.

In some implementations, the order data may be generated, and the transaction for the item may be completed, without additional input from the user. For example, a user navigating a seller website may initiate a transaction for an item to be shipped using the shipping benefit(s) associated with an online store without navigating away from the seller website. In such a case, after initiating the transaction, such as by providing input to a button or other element of the control, the user may continue to navigate the seller website uninterrupted.

In some implementations, an interface to initiate a transaction for an item that is associated with a shipping benefit of an online store may be accessed at a physical geolocation associated with a seller. For example, a seller may provide information regarding an item using a physical location, such as a store, a display, a billboard or other type of advertisement, and so forth. The information presented by the seller may include machine readable data, such as a QR code, data that may be input by a user such as a link or keywords for a search query, and so forth. In response to the machine readable data or input data that is input to a user device, data may be provided to the user device to cause the user device to present a widget or other type of control, as described previously. The user may provide input to elements of the control to authenticate a user account, initiate a transaction for the item, confirm a location and payment option for the transaction, and so forth.

Implementations described herein may therefore enable users accessing a seller website, or other type of information presented by a seller, to receive a shipping benefit associated with an online store when initiating a transaction for the item. Information regarding the availability of the shipping benefit, and in some cases estimated delivery times or other characteristics of the benefit, may be presented using a widget or other type of control that may be presented when a user accesses the seller website. The widget or other type of control may be updated as additional data regarding a user or an item is determined, such as by a user providing authentication data to access a user account or selecting or inputting a delivery location. An item may be purchased, rented, leased, and so forth, by a user without navigating away from a seller website, enabling the user to initiate a transaction for the item quickly, with a small number of interactions or navigational steps, after which the user may continue navigating the seller website.

Figure 1B:
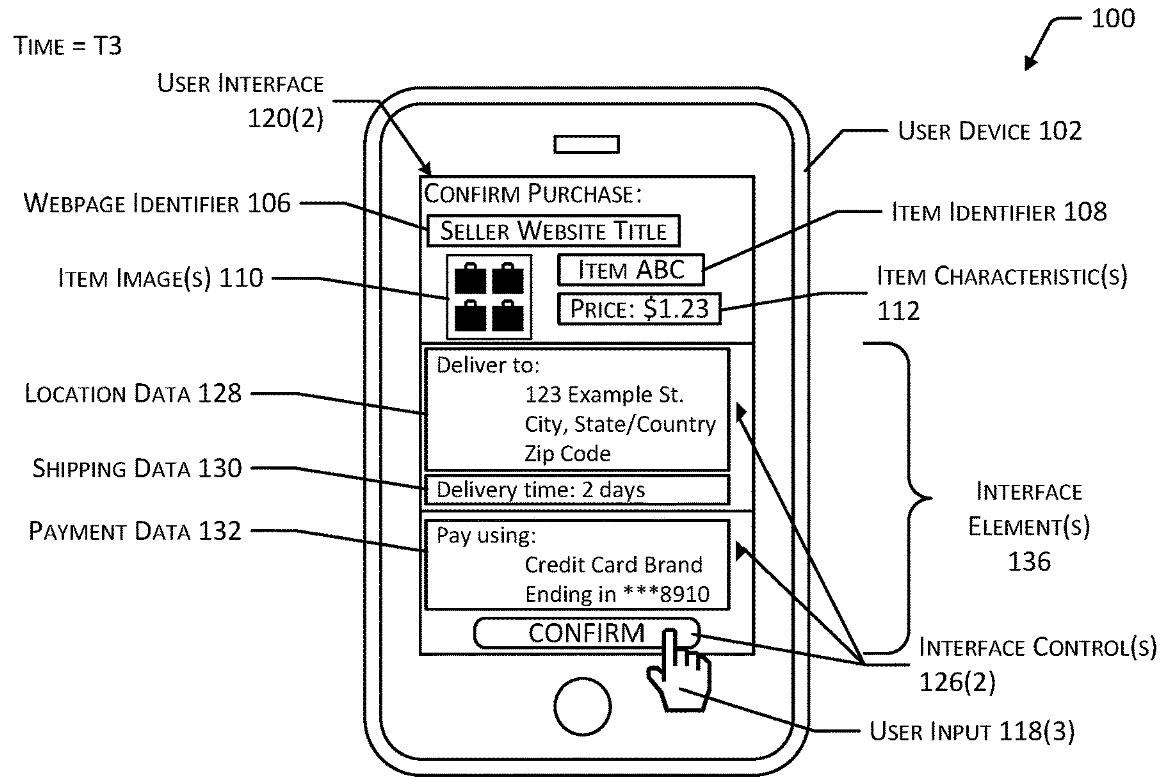
Figure 1B:
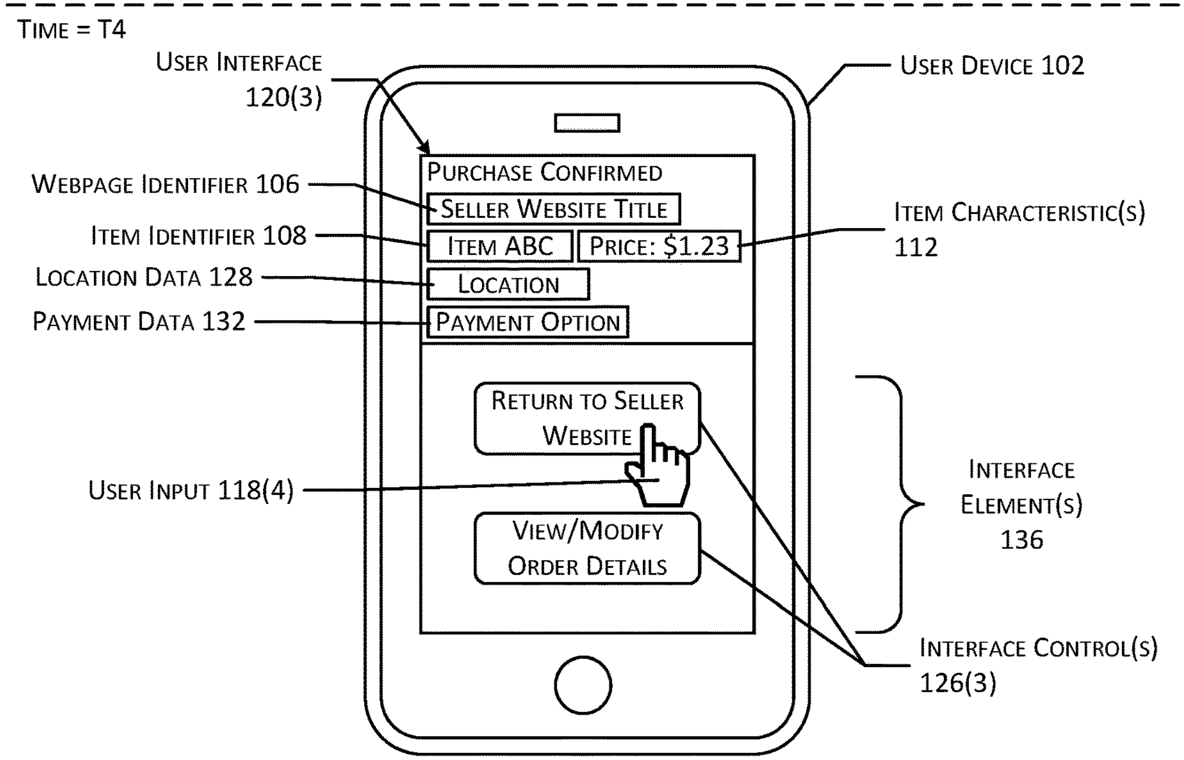

FIGS. 1A and 1B are diagrams 100 illustrating a user device 102 accessing a seller website that enables access by the user device 102 to a shipping benefit associated with a separate online store to transport items offered using the seller website. For example, the user device 102 may include a computing device executing an application, such as a browser application, that may be used to exchange data with one or more other computing devices, such as one or more servers associated with a seller website. While FIGS. 1A and 1B depict the user device 102 as a smartphone, in other implementations, the user device 102 may include any number or any type of computing device(s) including, without limitation, one or more personal computing devices, portable computing devices, wearable computing devices, vehicle-based computing devices, servers, set top boxes, gaming controllers, networked speaker devices, and so forth. The user device 102 may present one or more seller webpages 104 associated with the seller website. For example, at a first time T1, the computing device(s) associated with the seller website may provide data to the user device 102 to cause the user device 102 to present a seller webpage 104 on a display. In other implementations, a seller webpage 104 may be presented as audio, such as by providing audio data to the user device 102 to cause output using one or more speakers. A user device 102 may access the seller webpage 104 by providing a request, such as by receiving input indicative of a URI that represents the seller webpage 104, input to a link that navigates to the seller webpage 104, and so forth. In some cases, the seller webpage 104 may be accessed using information presented at a physical geolocation. For example, a seller may present a QR code or other machine-readable information at a physical location of a store, on a billboard or other type of advertisement, and so forth, and the user device 102 may present the seller webpage 104 in response to reading the QR code or other type of machine-readable information.

The seller webpage 104 may present information regarding one or more items that are available for purchase, lease, rental, subscription, and so forth. For example, the seller webpage 104 may include a webpage identifier 106 indicative of the seller webpage 104, such as a name, title, logo, or other information indicative of the seller website, a seller associated with the seller website, the seller webpage 104, one or more brands or manufacturers associated with the item represented in the seller webpage 104, and so forth. In some implementations, the webpage identifier 106 may include a Uniform Resource Identifier (URI) or another type of data that may be used to access the seller webpage 104, differentiate the seller webpage 104 from other webpages, and so forth. The seller webpage 104 may also include an item identifier 108 indicative of the item such as an item name or title, an alphanumeric string such as a stockkeeping unit (SKU), and so forth. In some implementations, the item identifier 108 may be indicative of one or more characteristics of an item. For example, an item identifier 108 may include text indicative of colors, dimensions, or other characteristics of the item. In some implementations, the seller webpage 104 may include one or more item images 110 depicting the item or one or more characteristics, components, or features of the item. In some cases, the seller webpage 104 may include audio data, video data, or other types of data that represent various features of the item. The seller webpage 104 may also present information indicative of one or more item characteristics 112 such as a price associated with the item, text or other types of data that describe one or more characteristics of the item, and so forth.

The seller webpage 104 may include various webpage elements 134 that present information, receive input, and so forth. For example, the webpage element(s) 134 may include one or more seller controls 114 such as buttons, links, or other types of elements that may receive input. A seller control 114 may be used to initiate a purchase transaction or other type of transaction for the item using one or more fulfillment methods associated with the seller website. For example, a user accessing the seller website may provide input to a seller control 114 to purchase an item, and may select from shipping and payment options associated with the seller website to cause transport of the item to a location selected by the user. In some implementations, other types of seller controls 114 may be used to add an indication of an item to an electronic shopping cart or other type of electronic list. Typically, the shipping and payment options associated with the seller website may be limited by the capabilities or capacity of the seller. For example, a seller that transports a small quantity of items during a selected time period may be unable to obtain shipment of items at beneficial rates or using expedited timeframes.

As described previously, the user device 102 may be provided with computer-executable code to cause one or more webpage elements 134, such as an online store control 116, which may include a widget or other type of element, to be presented in conjunction with the seller webpage 104. The online store control 116 may present an indication of one or more shipping methods or shipping benefits associated with the online store. For example, the online store may offer a benefit to certain users, such as users that are members of a benefit program, to all users of the online store, to certain sellers of items such as the seller associated with the seller webpage 104, and so forth. Continuing the example, one possible benefit available to a user accessing the seller webpage 104 may include receiving delivery of the indicated item within an expedited timeframe. In the implementation shown in FIG. 1A, the online store control 116 includes a widget that presents text indicating the availability of an expedited delivery time for users that are members of a shipping benefit program associated with the online store. For example, the online store control 116 may function to receive user input 118(1) to enable a user to access the shipping benefit, such as by authenticating a user account associated with the online store.

In some implementations, the online store control 116 may present an indication of an estimated delivery time to transport the item to a location associated with the user device 102. For example, a computing device associated with the online store may determine a network address or other data that may be used to determine an estimated location associated with the user device 102. This data may be used to determine an estimated delivery time based on correspondence between a location associated with the network address and shipping data that indicates the capabilities of one or more shippers to transport the item from a current location of the item to the estimated location of the user device 102. In some implementations, in cases where an item is stored at multiple locations, an estimated delivery time for transport of the item from more than one location may be determined, and the shortest determined delivery time may be presented. The estimated delivery time may be updated if the estimated location of the user device 102 changes. For example, some implementations of the online store control 116 may include an element that receives input indicative of a location, such as an address, zip code, and so forth. In response to the input indicative of a location, the computing device associated with the online store may determine a delivery time to transport the item to the input location, and an indication of the delivery time may be presented in association with the online store control 116. In cases where a user has previously authenticated a user account and a location associated with the user account may be determined, the online store control 116 may present an estimated delivery time based on the location associated with the user account.

At a second time T2, in response to user input 118(1) to the online store control 116, data may be provided to the user device 102 to cause presentation of a user interface 120 for receiving additional user input 118(2), such as to authenticate an account or otherwise access the shipping benefit associated with the online store. The user interface 120(1) may include one or more online store identifiers 122, such as a name, logo or image, or other data that may indicate that the presented user interface 120 is associated with the online store or the shipping benefit indicated in the online store control 116. The user interface 120(1) may also include one or more interface characteristics 124, such as descriptive text or instructions that indicate the purpose of the user interface 120(1), such as to acquire data to authenticate the user or to access one or more benefits associated with the online store. The use interface 120(1) may present various interface elements 136, which may be used to present information, receive input, or combinations thereof. For example, one or more of the interface elements 136 may include one or more interface controls 126, which may receive user input 118(2) to authenticate the user or access the benefit(s) indicated in the online store control 116. For example, the interface control(s) 126 may include one or more fields that may receive text or other user input 118(2) indicative of a user name or account name, a password, and so forth. FIG. 1A also depicts the interface control(s) 126 including a button that may be used to confirm entry of a user name or password, cause transmission of data to one or more computing devices associated with the online store, and so forth. In response to user input 118(2) provided to the user interface 120, a user account associated with the user input 118(2) may be determined, and an authorization status associated with one or more of the item, user device 102, user account, or seller for transport using one or more shipping benefits may be determined. For example, determination of an authorization status may include determining that the user account associated with the user input 118(2) is associated with a subscription for access to the shipping benefit(s) indicated in the online store control 116.

At a third time T3, in response to authentication of the user input 118(2), a user account associated with the user input 118(2) may be determined. Additionally, an authorization status associated with the user account, the user device 102, seller website, item, or other entity, or data indicative of a second user interface 120(2) may be determined and used to confirm that a transaction for the item indicated in the seller webpage 104 may be performed by the user device 102. For example, in response to the user input 118(2) provided using the first user interface 120(1), data associated with a user account associated with the user input 118(2) may be determined, such as a default or selected location for shipment of items, a default or selected payment option for performing transactions associated with items, data indicative of the seller webpage 104, item identifier 108, or online store control 116 that was previously accessed, and so forth. Data indicative of a second user interface 120(2) that presents at least a portion of this information may be provided to the user device 102.

For example, FIG. 1B depicts the second user interface 120(2) including the webpage identifier 106 indicative of the seller webpage 104, and the item identifier 108, item image(s) 110, and one or more item characteristic(s) 112 associated with the item presented in the seller webpage 104. In some implementations, the second user interface 120(2) may include one or more identifiers or other data indicative of the online store, or the shipping benefit associated with the online store. For example, the second user interface 120(2) may present location data 128 indicative of a location associated with the determined user account. The location data 128 may include a default or selected address or other indication of a geolocation associated with the user account. The user interface 120(2) may also include one or more interface elements 136 that present information or receive input. In some implementations, an interface control 126(2) associated with the location data 128 may be selected to enable input or selection of a different location.

Shipping data 130 may be presented in association with the location data 128, the shipping data 130 indicating an estimated delivery time for transport of an item to the location indicated by the location data 128. For example, the estimated delivery time indicated in the shipping data 130 may differ from an estimated delivery time indicated in the online store control 116 due to the information presented in the online store control 116 being determined based on an estimated location of the user device 102, such as an estimated location based on a network address. Conversely, the estimated delivery time indicated in the shipping data 130 may be based on the more precise geolocation indicated in the shipping data 130. In some implementations, if an interface control 126(2) is used to select or input a different location, the delivery time indicated in the shipping data 130 may be modified based on the selected or input location. The second user interface 120(2) may additionally present payment data 132, which may indicate one or more payment options, such as data indicative of an account, credit card, payment processor, or other type of payment instrument associated with the determined account. In some cases, an interface control 126(2) associated with the payment data 132 may be used to input or select a different payment option. The second user interface 120(2) may also include a button or other type of interface control 126(2) that may be used to confirm the presented location data 128 and payment data 132 and initiate a transaction for the item in response to user input 118(3).

At a fourth time T4, in response to user input 118(3) to the second user interface 120(2) to confirm the transaction, data indicative of a third user interface 120(3) may be provided to the user device 102 that presents information regarding the transaction. For example, the third user interface 120(3) may present the webpage identifier 106, item identifier 108, one or more item characteristics 112, the location data 128, payment data 132, and so forth. The third user interface 120(3) may have one or more interface elements 136, such as interface controls 126(3) to return to the seller webpage 104 or to view or modify characteristics of the transaction, such as to cancel the transaction, modify a type or quantity of items, modify a location or payment option, and so forth. For example, in response to user input 118(4) to an interface control 126(3) to return to the seller webpage 104, the user device 102 may return to presentation of the seller webpage 104 shown at the first time T1 in FIG. 1A. In some implementations, a user device 102 may return to presentation of the seller webpage 104 automatically after providing the user input 118(3) to the second user interface 120(2), and presentation of a third user interface 120(3) may be omitted.

Therefore, through use of the online store control 116 to initiate a transaction for an item, a user device 102 may be used to initiate the transaction using a small number of steps and inputs, and may return to navigating a seller website with minimal interruption to initiate the transaction. For example, if a user has previously provided authentication of a user account during a session, presentation of the first user interface 120(1) may be omitted, and in response to user input 118(1) to an online store control 116, the second user interface 120(2) may be presented, or a transaction for an item may be automatically initiated, enabling the user to initiate a transaction with a small number of steps to promptly continue navigating the seller website.

While FIGS. 1A and 1B depict a user device 102 presenting a seller webpage 104 and one or more user interfaces 120 using a display, and user input 118 that includes touch gestures or clicks, input text, and so forth, other implementations may include use of an audio user interface 120 and audio input. For example, a seller webpage 104 or user interface 120 may be presented using one or more speakers or other audio output devices, and a user may provide user input 118, such as speech or other utterances, using one or more microphones. Similarly, the user interfaces 120 described with regard to FIGS. 1A and 1B may be presented using audio output, and input may be provided to the user interfaces 120 using speech or other types of audio input.

Figure 2A:
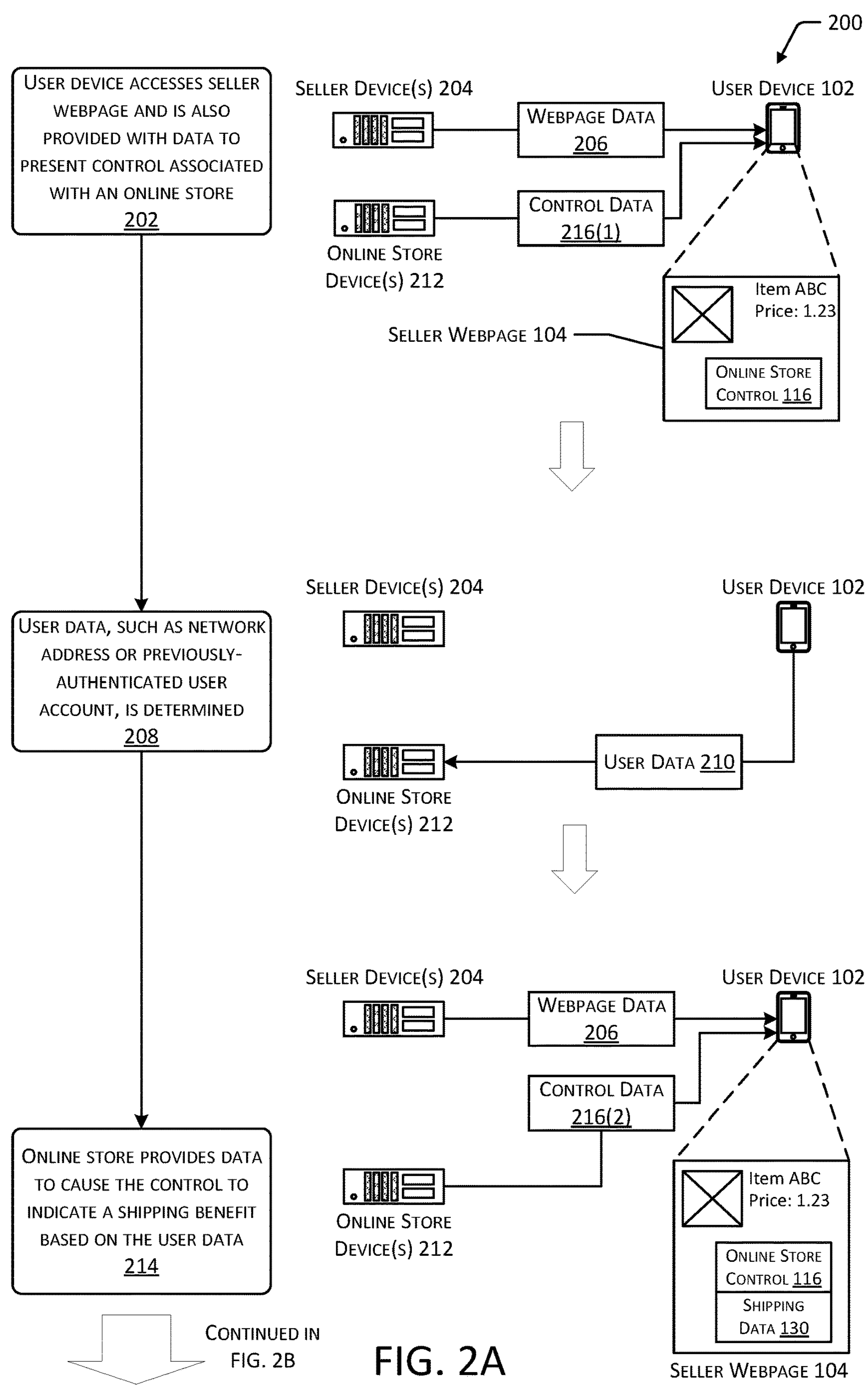
FIGS. 2A and 2B are diagrams illustrating an implementation of a process for enabling access by a user to a shipping benefit associated with an online store when a user accesses a separate seller website that offers an item.
Figure 2B:
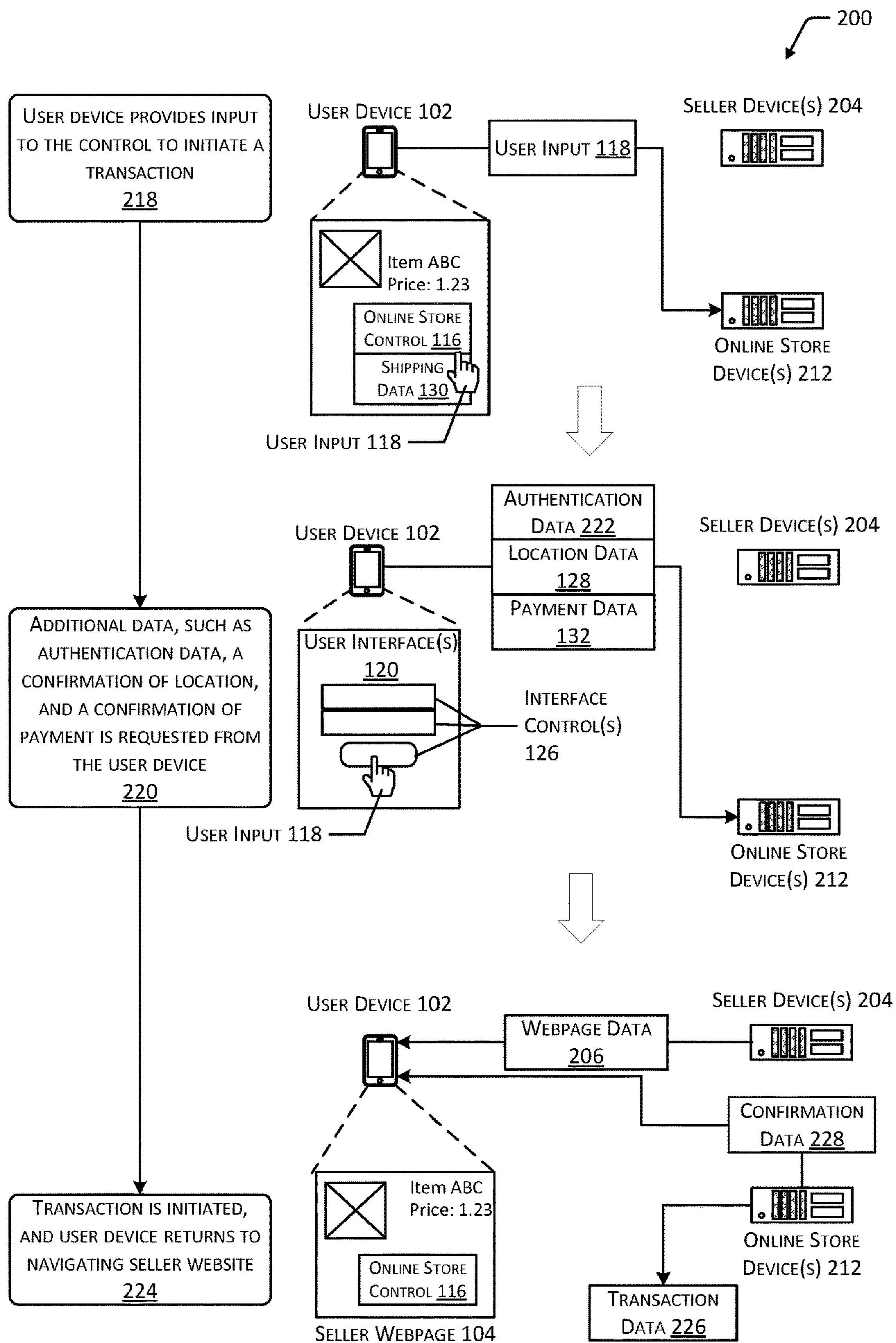

FIGS. 2A and 2B are flow diagrams 200 illustrating an implementation of a process for enabling access by a user to a shipping benefit associated with an online store when a user accesses a separate seller website that offers an item. At block 202, a user device 102 is shown accessing a seller webpage 104. The user device 102 may also be provided with data to present a control associated with an online store. For example, one or more seller devices 204 may provide webpage data 206 that represents the seller webpage 104 to the user device 102. While FIG. 2A depicts the seller device(s) 204 as a server, the seller device(s) 204 may include any number and any type of computing device(s) including, without limitation, the types of computing devices described with regard to the user device 102. The user device 102 may execute a browser application or other type of application that causes presentation of the seller webpage 104 on a display of the user device 102 based on the webpage data 206. As described with regard to FIGS. 1A and 1B, a seller webpage 104 may present information regarding an item available for purchase, lease, rental, subscription, and so forth. For example, the seller webpage 104 may present one or more identifiers indicative of the webpage, the item, characteristics of the item, and so forth, and may include one or more seller controls 114 that may be used to initiate a transaction for the item using one or more shipping methods associated with the seller website. One or more online store devices 212 may also provide control data 216(1) to the user device 102 to cause the seller webpage 104 to be presented in conjunction with an online store control 116 that may present information regarding a shipping option associated with an online store that is separate from the seller website. The online store device(s) 212 may be associated with an online store or other website that differs from the seller website. While FIG. 2A depicts the online store device(s) 212 as a server, in other implementations, the online store device(s) 212 may include any number and any type of computing device(s) including, without limitation, the types of computing devices described with regard to the user device 102 and seller device(s) 204. In some implementations, the online store device(s) 212 may determine one or more conditions associated with the seller device(s) 204, user device 102, seller webpage 104, or item, and the control data 216(1) may be provided in response to this determination. For example, such conditions may include an authorization status of a seller to offer an item in association with the shipping benefit indicated in the online store control 116, a quantity of inventory of the item at a selected location that exceeds a threshold quantity, and so forth.

At block 208, user data 210 may be determined based on the access by the user device 102 to the seller webpage 104. The user data 210 may include information such as a network address associated with the user device 102, hardware or software components of the user device 102, cookies or other data previously stored on the user device 102, data that may be used to associate the user device 102 with a previously-authenticated user account, and so forth. For example, FIG. 2A depicts the online store device(s) 212 determining user data 210, such as an Internet Protocol (IP) address or other type of network address, from the user device 102. In other implementations, at least a portion of the user data 210 may be determined by the seller device(s) 204 in addition to or in place of the online store device(s) 212. For example, the online store device(s) 212 may communicate with the user device 102 to provide data to cause presentation of the online store control 116 and to modify information presented within the online store control 116, such as shipping data 130 indicative of an estimated delivery timeframe. Continuing the example, user data 210 received by the online store device(s) 212, such as a network address, may be used to determine an estimated location associated with the user device 102, which in turn may be used to determine an estimated delivery timeframe to transport an item to the estimated location.

At block 214, the online store may provide data to cause the online store control 116 to indicate a shipping benefit based on the determined user data 210. For example, the online store device(s) 212 may provide control data 216(2) to the user device 102 that may cause the online store control 116 to present shipping data 130 based on the user data 210. Continuing the example, the user data 210 may include a network address or other information from which a location associated with the user device 102 may be determined. The online store device(s) 212 may determine an estimated delivery time to transport the item to the location. The control data 216(2) may cause the online store control 116 to present shipping data 130 indicative of the estimated delivery time. In some implementations, the online store control 116 may present an indication of the location determined based on the user data 210, such as an indication of an estimated geolocation determined based on a network address.

As shown in FIG. 2B, at block 218, the user device 102 may provide user input 118 to the online store control 116 to initiate a transaction associated with an item. For example, the online store control 116 may include one or more buttons, links, or other elements, or may itself function as a button or link, that may cause initiation of a transaction, or navigation to one or more user interfaces 120, based on an authentication status and authorization status associated with the user device 102. For example, in response to user input 118 associated with the online store control 116, the online store device(s) 212 may determine whether the user device 102 is associated with a user account that has been previously authenticated, whether a determined user account, user device 102, seller device 204, seller webpage 104, item, and so forth is authorized to access a particular shipping option or benefit, and so forth. Continuing the example, in response to user input 118 associated with the online store control 116, one or more user interfaces 120 may be presented to receive additional data from the user device 102.

At block 220, additional data may be determined from the user device 102, such as through use of one or more user interfaces 120. For example, the additional data may include authentication data 222 that may be used to authenticate a user account, location data 128 such as input, selection, or confirmation of a location for transport of the item, payment data 132 that may be used to input, select, or confirm a payment option for use with a transaction for the item, and so forth. The user interface(s) 120 may include one or more controls or other elements for receiving the user input 118, such as text fields, selectors such as sliders, radio buttons, drop down menus or lists, and so forth, buttons for selecting or confirming user input 118, or other types of controls or elements. Based on the additional data received from the user device 102, the online store device(s) 212 may determine one or more of location data 128, payment data 132, and delivery data 130, as described with regard to FIGS. 1A and 1B. For example, the online store device(s) 212 may provide additional control data 216 to cause presentation of an updated estimated delivery time in association with the online store control 116, based on a location determined based on the user input 118 or a location associated with an authenticated user account. As described with regard to FIG. 1B, one or more presented user interfaces 120 may include one or more interface controls 126 to confirm information associated with a transaction and cause the transaction to be initiated.

At block 224, the transaction may be initiated, and the user device 102 may be returned to navigating the seller website. For example, in response to user input 118 initiating the transaction, the online store device(s) 212 may generate transaction data 226 that may causes transport of one or more items to a location determined based on the user data 210 or user input 118. Continuing the example, transaction data 226 may be provided to one or more shippers, fulfillment systems, distribution centers, warehouses, and so forth to cause inclusion of the item(s) in a shipment that may be delivered to a location associated with the user data 210 or user input 118. The online store device(s) 212 may send confirmation data 228 indicative of the transaction to one or more of the seller device(s) 204 or user device 102. The seller device(s) 204 may also provide webpage data 206 to the user device 102 to present the seller webpage 104 or another webpage of the seller website. For example, after using the online store control 116 to initiate a transaction, the transaction may be completed with a small number of steps, and in some cases, a single user input 118, after which the user device 102 may continue navigating the seller website.

Figure 3:
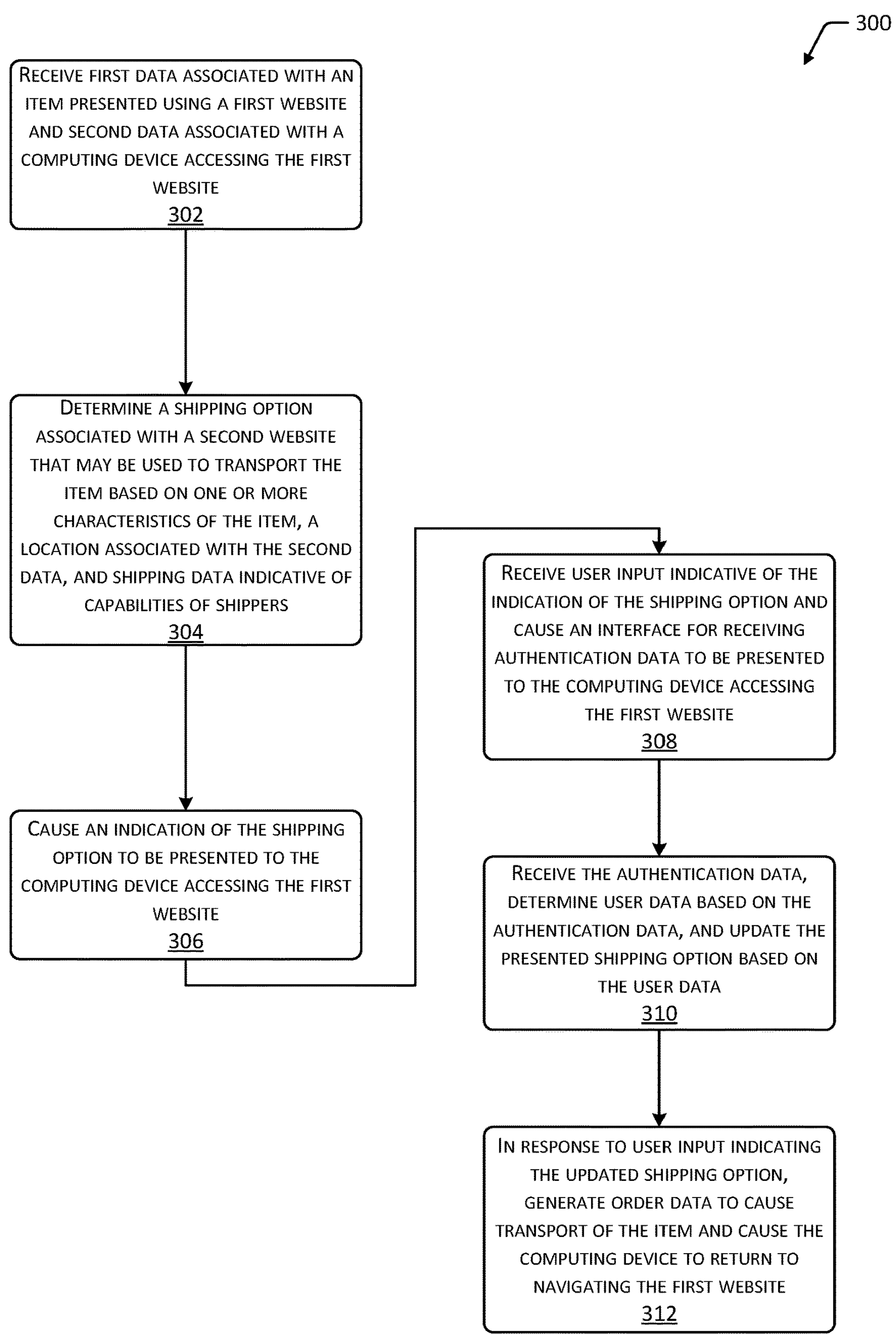
FIG. 3 is a flow diagram illustrating an implementation of a method for using a shipping option associated with a second website to transport an item associated with a first website.

FIG. 3 is a flow diagram 300 illustrating an implementation of a method for using a shipping option associated with a second website to transport an item associated with a first website. At block 302, first data associated with an item that is presented using a first website may be received. Second data associated with a computing device accessing the first website may also be received. For example, a user device 102 may access a website associated with a seller, such as by accessing a seller webpage 104 that presents information regarding an item. An online store control 116 may be used to present information regarding one or more shipping options associated with a second website, such as a website associated with an online store, when the seller webpage 104 is accessed by a user device 102. For example, one or more shipping options associated with the second website may be unavailable to the first website, but may be selectively made available to particular users, to particular sellers, to transport particular items, and so forth. When the user device 102 accesses the seller webpage 104, the first data may include one or more identifiers indicative of the seller, the seller webpage 104 or website, the item, or combinations thereof, which may be provided to an online store device 212. The second data may include data indicative of the user device 102, such as a network address, data indicative of one or more hardware or software components associated with the user device 102, data indicative of a cookie or other data stored on the user device 102 by one or more of a seller device 204 or online store device 212, data indicative of a user account associated with the user device 102, and so forth.

At block 304, a shipping option associated with the second website that may be used to transport the item may be determined. The determined shipping option may be based on one or more characteristics of the item, such as a location of the item, item weight or dimensions, characteristics of the item that require particular methods of handling or transport, and so forth. The determined shipping option may be based on a location that may be determined from the second data indicative of the user device 102, such as by determining an estimated location of the user device 102 based on a network address, a location associated with a user account associated with the user device 102, and so forth. The determined shipping option may also be based on shipping data 130 indicative of capabilities of shippers to transport the item from a location of the item to the estimated location associated with the user device 102. As such, the shipping option may indicate a delivery timeframe, and in some implementations, one or more other characteristics of the manner in which the item may be transported.

At block 306, an indication of the shipping option may be presented to the computing device accessing the first website. For example, data from an online store device 212 indicative of the shipping option may be provided to the user device 102 to cause presentation of information indicative of the shipping option in association with the online store control 116. Continuing the example, the online store control 116 may present an estimated delivery time associated with use of a shipping method to transport the item from a location associated with the item to a location determined based on the data associated with the user device 102. In some implementations, the online store control 116 may present other characteristics of the shipping option, such as an identifier associated with a shipper, a location or method associated with the shipping option, and so forth.

At block 308, user input 118 indicative of the indication of the shipping option may be received, and in response to the user input 118, an interface for receiving authentication data 222 may be presented to the computing device accessing the first website. For example, a user device 102 may select or otherwise provide input to an online store control 116 that presents information regarding a shipping option associated with the second website. In response to this user input 118, a user interface 120 may be presented to request additional data, such as authentication data 222, from a user associated with the user device 102. Continuing the example, a user may provide a name and password associated with a user account, or other authentication data 222 to authenticate a user account, create a new user account, and so forth. An authorization status of the user account to use the shipping option indicated in the online store control 116 may then be determined. In other cases, the online store device(s) 212 may determine that the first website, seller webpage 104, item, or other characteristic of the seller is authorized for use of the shipping option indicated in the online store control 116.

At block 310, authentication data 222 may be received, and user data 210 may be determined based on the authentication data 222. The presented shipping option may then be updated based on the user data 210. For example, based on the authentication data 222 input to the user interface 120, a corresponding user account may be determined. A location associated with the user account may be used to determine a delivery timeframe or other characteristic(s) of the shipping option, and control data 216 may be provided to present updated information based on the determined characteristic(s) of the shipping option.

At block 312, in response to user input 118 indicating the updated shipping option, order data may be generated to cause transport of the item. The computing device may also be provided with data to cause the computing device to return to navigating the first website. Order data may include transaction data 226, confirmation data 228, and other data indicative of the characteristics associated with transport of an item from a location of the item to a location associated with the user device 102 or user account. For example, order data may include an indication of a current location of the item, a location to which the item is to be delivered, characteristics of a shipping method such as an identifier associated with a shipper, identifiers indicative of the item, seller, and in some cases the online store, and other data that may be used to facilitate transport of the item to the location associated with the user device 102 or user account. After initiating a transaction for the item using a small amount of inputs, the user device 102 may be returned to the seller webpage 104 or other webpage associated with the seller website.

Figure 4:
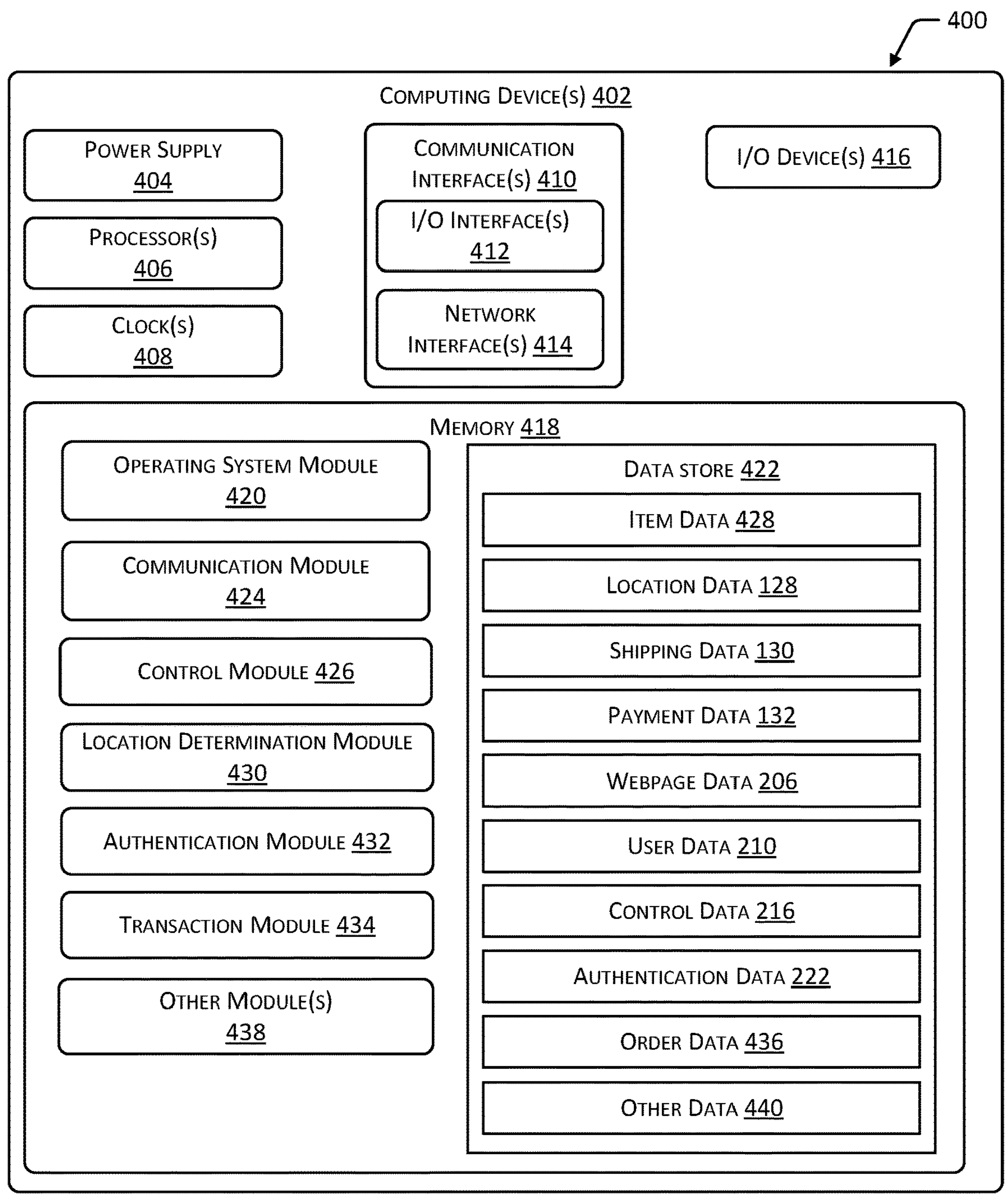
FIG. 4 is a block diagram depicting an implementation of a computing device that may be used within the present disclosure.

FIG. 4 is a block diagram 400 depicting an implementation of a computing device 402 that may be used within the present disclosure. In some implementations, the computing device 402 may include one or more online store devices 212 that may be used to determine characteristics associated with transport of items to a location associated with a user device 102 or user account. In other implementations, the computing device 402 may include one or more user devices 102, seller devices 204, or other computing devices 402 that may communicate with a user device 102 or seller devices 204. Therefore, while FIG. 4 depicts a single block diagram 400 of a computing device 402 such as an online store device 212, any number and any type of computing devices 402 may be used to perform the functions described herein. Additionally, any combination of online store devices 212, seller devices 204, and user devices 102 may be used to perform the functions described herein.

One or more power supplies 404 may be configured to provide electrical power suitable for operating the components of the computing devices 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth. Continuing the example, data from the clock(s) 408 may be used to determine dates and times associated with transport of items between locations.

The computing device 402 may include one or more communication interfaces 410, such as input/output (I/O) interfaces 412, network interfaces 414, and so forth. The communication interfaces 410 may enable a computing device 402, or components of the computing device 402, to communicate with other computing devices or components of the other computing devices. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 416. The I/O devices 416 may include any manner of input devices or output devices associated with the computing device(s) 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402, and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing devices 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 420 may be distributed across one or more other devices including other computing devices, network attached storage devices, and so forth.

A communication module 424 may be configured to establish communications with one or more other computing devices. Communications may be authenticated, encrypted, and so forth.

The memory 418 may also store a control module 426. The control module 426 may determine control data 216 for incorporation of a widget or other type of online store control 116 that may be presented in conjunction with a webpage. In some implementations, the control module 426 may access webpage data 206 indicative of a seller webpage 104 or other type of webpage. For example, webpage data 206 may include HTML code or other data that may be used to cause presentation of a webpage. The control module 426 may also provide control data 216 to update, replace, or otherwise modify information presented within the online store control 116, such as in response to user input 118 or user data 210 indicative of a selected location for transport of an item. For example, if a location associated with a user, user device 102, or user account changes or the location associated with an item changes, control data 216 that includes an updated estimated delivery time may be provided to a computing device 402 to cause information presented in association with an online store control 116 to be changed. Other characteristics associated with transport of an item in addition to or in place of a delivery time may also be presented in association with the online store control 116 and modified using control data 216. In some cases, the control module 426 may access item data 428 indicative of characteristics of the item, shipping data 130 indicative of capabilities of shippers to transport items based on characteristics of the items, and so forth, which may be used to determine shipping options associated with an item, delivery timeframes associated with transport of the item, and so forth.

The memory 418 may also store a location determination module 430. The location determination module 430 may determine an estimated location associated with a computing device 402 based on user data 210 or other data indicative of a network address or other characteristics of communication with the computing device 402. For example, the location determination module 430 may access data that associates network addresses, or other characteristics of a communication, computing device 402, networks used by the computing device 402, and so forth, with corresponding estimated geolocations. The location determination module 430 may also determine locations based on user data 210 or user input 118.

The memory 418 may also store an authentication module 432. The authentication module 432 may be used to authenticate a user, computing device 402, or user account, such as by determining correspondence between authentication data 222 received from another computing device 402 and authentication data 222 indicative of a correct or expected authentication. For example, the authentication module 432 may verify the correct input of an account name and password, or other types of authentication. An authenticated user or user account may be used to determine one or more indications of location, such as a physical address, associated with a user account. In some implementations, a separate computing device may receive and process authentication data 222 and provide data indicative of an authentication. In some cases, the authentication module 432 or another module associated with the computing device 402 may determine an authorization status associated with a user account, computing device 402, item, seller, or seller website, which may indicate eligibility to receive the item using the indicated shipping option associated with the online store.

The memory 418 may additionally store a transaction module 434. The transaction module 434 may be used to complete a purchase transaction for an item, or another type of transaction such as a rental, lease, or subscription, based on location data 128, shipping data 130, and payment data 132. The transaction module 434 may generate order data 436, which may include transaction data 226, confirmation data 228, or other data indicative of characteristics of a transaction or transport of an item. The transaction module 434 may access data indicative of valid payment and shipping options, such as payment options that may be available for use with selected shipping benefits, and other data for completing purchase transactions, and may verify and validate payment before generating order data 436 to cause transport of the item to a location associated with a user account.

Other modules 438 may also be present in the memory 418. For example, other modules 438 may include permission or authorization modules to enable users to access and modify data associated with one or more computing devices 402. Other modules 438 may include permission modules to enable a user to opt in or otherwise provide authorization for data associated with sellers, seller devices 204, seller accounts, users, user devices 102, and user accounts to be acquired and used to facilitate purchase and transport of items. Other modules 438 may also include encryption modules to encrypt and decrypt communications between computing devices, user interface modules to generate interfaces for receiving input from users, and so forth.

Other data 440 within the data store(s) 422 may include configurations, settings, preferences, and default values associated with computing devices. Other data 440 may also include encryption keys and schema, access credentials, and so forth.

In different implementations, different types of computing devices may have different capabilities or capacities. For example, servers such as online store devices 212 may have greater processing capabilities or data storage capacity than portable computing devices used as user devices 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

one or more memories storing computer-executable instructions; and one or more hardware processors to execute the computer-executable instructions to:

provide, to a first computing device associated with a first website, first computer-executable instructions associated with a control that indicates first information associated with an item, wherein the first computing device is associated with second computer-executable instructions that cause presentation of second information associated with the first website, and wherein the first computer-executable instructions cause presentation of the control in association with the first website;

determine a network address associated with a second computing device accessing the first website;

in response to determining the network address:

determine one or more characteristics of the item, wherein the one or more characteristics include a first location of the item;

determine a second location associated with the network address; and determine, based on the one or more characteristics, the second location, and shipping data indicative of capabilities of one or more shippers to transport the item, a first delivery time associated with transport of the item from the first location to the second location;

provide first data to the second computing device to cause an indication of the first delivery time to be presented in association with the control, wherein the indication of the first delivery time and the control are presented in association with the second information associated with the first website;

receive first input provided in association with the control;

provide second data to the second computing device to cause presentation of a prompt to receive authentication data;

receive the authentication data from the second computing device;

in response to the authentication data:

determine a user account associated with the authentication data, wherein the user account is associated with a third location; and determine a second delivery time associated with transport of the item from the first location to the third location, wherein the second delivery time is determined based on the one or more characteristics, the third location, and the shipping data;

provide third data to the second computing device to cause an indication of the second delivery time to be presented in association with the control;

receive second input provided to a portion of the control associated with a transaction for the item;

provide fourth data to the second computing device to cause an indication of the item, the third location, and a payment option associated with the user account to be presented in association with the control;

receive third input provided to a portion of the control associated with confirming the transaction; and generate order data indicative of the item and the third location to cause transport of the item from the first location to the third location, wherein the second computing device presents the first website after the third input is received.

2. The system of claim 1, further comprising computer-executable instructions to:

receive, from the first computing device, fifth data that includes: an indication of the item, the one or more characteristics, and a fourth location associated with the item;

determine the first location based on the fifth data and the shipping data;

provide an indication of the first location to the first computing device; and in response to the first data, determine that a quantity of the item at the first location is greater than a threshold quantity;

wherein the first data is provided to the second computing device in response to the quantity of the item being greater than the threshold quantity.

3. The system of claim 1, further comprising computer-executable instructions to:

determine an authorization status associated with the user account, wherein the authorization status is indicative of eligibility to receive the item within the second delivery time; and wherein the third data is provided to the second computing device in response to the authorization status.

4. A method performed using one or more computing devices having one or more processors that execute computer-executable instructions, the method comprising:

receiving, from a first computing device, a first identifier indicative of an item;

receiving a second identifier indicative of a second computing device accessing a first interface associated with the first computing device, wherein the first interface includes a first indication of the item;

providing, to the first computing device, first computer-executable instructions associated with a control that presents first information associated with the item, wherein the first computing device is associated with second computer-executable instructions that cause presentation of second information associated with the first interface, and wherein the first computer-executable instructions cause presentation of the control in association with the first interface;

receiving first input associated with a portion of the control that is associated with a transaction for the item;

providing first data to one or more of the first computing device or the second computing device to cause presentation of an interface for receiving authentication data; receiving the authentication data associated with the interface for receiving authentication data;

providing second data to the one or more of the first computing device or the second computing device to cause presentation of third information, wherein the third information includes a second indication of the item and a first location associated with the authentication data;

receiving second input to confirm the transaction; and generating order data indicative of the item and the first location to cause transport of the item to the first location, wherein the second computing device presents the first interface after the second input is received.

5. The method of claim 4, wherein one or more of the first information, the second information, or the third information are presented at least partially as audio output using one or more audio output devices associated with the one or more of the first computing device or the second computing device.

6. The method of claim 4, wherein the first identifier corresponds to one or more of: machine readable data or input data, that is presented at a physical geolocation associated with the item, and the first identifier and the second identifier are received in response to input of the one or more of the machine readable data or the input data to the first computing device.

7. The method of claim 4, further comprising:

determining a second location based on the second identifier;

determining a first delivery time to transport the item to the second location; and including an indication of the first delivery time in association with the control.

8. The method of claim 7, further comprising:

receiving third input associated with the first interface, wherein the third input indicates a third location;

determining a second delivery time to transport the item to the third location; and providing third data to the one or more of the first computing device or the second computing device to cause presentation of an indication of the second delivery time.

9. The method of claim 4, further comprising:

determining a first delivery time to transport the item to the first location; and providing third data to the one or more of the first computing device or the second computing device to cause presentation of an indication of the first delivery time in association with the control.

10. The method of claim 9, further comprising:

receiving third input indicative of a second location;

determining a second delivery time to transport the item to the second location; and providing third data to the one or more of the first computing device or the second computing device to cause presentation of an indication of the second delivery time.

11. The method of claim 4, further comprising:

determining a user account based on the authentication data;

determining a first payment option associated with the user account; and presenting an indication of the first payment option.

12. The method of claim 11, further comprising:

receiving third input indicative of one or more of: selection of a second payment option or input of the second payment option; and providing third data to the one or more of the first computing device or the second computing device to cause presentation of an indication of the second payment option.

13. The method of claim 4, further comprising:

determining a user account based on the authentication data; and determining an authorization status associated with the user account, wherein the authorization status is indicative of eligibility to receive the item using the control;

wherein the second data is provided in response to the authorization status.

14. The method of claim 4, further comprising:

determining a second location associated with the item; and determining that a quantity of inventory of the item at the second location is greater than a threshold quantity;

wherein one or more of the first computer-executable instructions, the first data, or the second data is provided in response to the quantity of the item being greater than the threshold quantity.

15. A system comprising:

one or more memories storing computer-executable instructions; and one or more hardware processors to execute the computer-executable instructions to:

receive, from a first computing device, a first identifier indicative of an item;

receive a second identifier indicative of a second computing device accessing a first interface that includes a first indication of the item;

determine a first location associated with one or more of the first computing device or the second computing device;

determine a second location associated with the item;

determine a first delivery time to transport the item from the second location to the first location;

provide, to the first computing device, first computer-executable instructions associated with a control that presents first information associated with the item, wherein the first computing device is associated with second computer-executable instructions that cause presentation of second information associated with the first interface, and wherein the first computer-executable instructions cause presentation of the control in association with the first interface;

receive first input associated with a portion of the first interface associated with a transaction for the item;

determine authentication data associated with the second computing device;

determine a third location associated with the authentication data;

determine a second delivery time to transport the item from the second location to the third location;

provide first data to the one or more of the first computing device or the second computing device to cause presentation of the second delivery time;

receive second input to confirm the transaction; and generate order data indicative of the item to cause transport of the item to the third location, wherein the second computing device presents the first interface after the second input is received.

16. The system of claim 15, further comprising computer-executable instructions to:

receive, from the first computing device, second data indicative of one or more characteristics of the item;

determine the second location based on the one or more characteristics and shipping data indicative of capabilities of one or more shippers to transport the item;

provide an indication of the second location; and confirm receipt of at least a threshold quantity of the item at the second location;

wherein the first computer-executable instructions are is provided in response to the receipt of the at least the threshold quantity of the item.

17. The system of claim 15, further comprising computer-executable instructions to:

determine that the second location and a fourth location are associated with the item;

determine, based on the first location and shipping data indicative of capabilities of one or more shippers to transport the item, the first delivery time associated with transport of the item from the second location to the first location; and determine, based on the first location and the shipping data, a third delivery time associated with transport of the item from the fourth location to the first location;

wherein the first delivery time is included in the first information based on the first delivery time being less than the third delivery time.

18. The system of claim 15, wherein the first computing device is associated with a first website that includes the first interface, the system further comprising computer-executable instructions to:

provide, to the second computing device, executable code to cause presentation of the control in association with the first interface, wherein the transaction for the item is associated with a second website that differs from the first website.

19. The system of claim 15, wherein the first identifier is associated with one or more of: machine readable data or input data, presented at a physical geolocation, and wherein the first identifier is received in response to input of the one or more of the machine readable data or the input data to the first computing device.

20. The system of claim 15, wherein:

the first computing device is associated with a first website that includes the first interface;

the second computing device accesses the first interface and provides the first input, the authentication data, and the second input; and the one or more of the first computing device or the second computing device provides the first input, the authentication data, and the second input to a third computing device associated with a second website, wherein the third computing device determines one or more of the first location, the second location, the first delivery time, the first computer-executable instructions, the authentication data, the third location, the second delivery time, or the order data.

* * * * *

UNITED STATES PATENT AND TRADEMARK OFFICE

CERTIFICATE OF CORRECTION

PATENT NO. : 12,062,082 B2
APPLICATION NO. : 17/649985
DATED : August 13, 2024
INVENTOR(S) : Beth Anne Porter et al.

It is certified that error appears in the above-identified patent and that said Letters Patent is hereby corrected as shown below:

In the Claims

Column 22, Claim 16, Line 4:
Currently reads "wherein the first computer-executable instructions are is provided"
Where it should read --wherein the first computer-executable instructions are provided--

Signed and Sealed this
First Day of October, 2024

Katherine Kelly Vidal

Katherine Kelly Vidal
*Director of the United States Patent and Trademark Office*